US012632240B2

(12) United States Patent
Muslimov et al.

(10) Patent No.: US 12,632,240 B2
(45) Date of Patent: May 19, 2026

(54) DEPLOYING ASSETS

(71) Applicant: Stripe, LLC, South San Francisco, CA (US)

(72) Inventors: Rustem Muslimov, Mission Viejo, CA (US); Mark Fielbig, Wappingers Falls, NY (US); Jack DeLoach, Denver, CO (US); Shanshan Chen, Bellevue, WA (US); Atul Bhatia, Fremont, CA (US); Vinay Padma, New York, NY (US)

(73) Assignee: Stripe, LLC, South San Francisco, CA (US)

( * ) Notice: Subject to any disclaimer, the term of this patent is extended or adjusted under 35 U.S.C. 154(b) by 182 days.

(21) Appl. No.: 18/083,117

(22) Filed: Dec. 16, 2022

(65) Prior Publication Data

US 2024/0201975 A1     Jun. 20, 2024

(51) Int. Cl.
*G06F 9/445* (2018.01)
*G06F 8/65* (2018.01)

(52) U.S. Cl.
CPC ...................................... *G06F 8/65* (2013.01)

(58) Field of Classification Search
CPC ....... H04L 67/60; H04L 41/08; H04L 67/125; H04L 67/34; G06Q 30/0267
USPC .................................................. 717/168–178
See application file for complete search history.

(56) References Cited

U.S. PATENT DOCUMENTS

| | | | | |
|---|---|---|---|---|
| 11,775,278 B1 * | 10/2023 | Deshmukh | ................ | G06F 8/65 |
| | | | | 717/173 |
| 2008/0306798 A1 * | 12/2008 | Anke | ......................... | G06F 8/61 |
| | | | | 705/7.26 |
| 2014/0075567 A1 * | 3/2014 | Raleigh | .............. | G06Q 30/0283 |
| | | | | 726/26 |

* cited by examiner

*Primary Examiner* — Chuck O Kendall
(74) *Attorney, Agent, or Firm* — BAKERHOSTETLER

(57) ABSTRACT

The present disclosure is directed to handling deployment of assets (e.g., applications) to devices (e.g., card readers, payment terminals, etc.), substantially as shown in and/or described in connection with at least one of the figures, as set forth more completely in the claims.

18 Claims, 11 Drawing Sheets

Store one or more assets to be deployed to a set of devices
701

Receive a request to approve a deploy plan that specifies parameters for updating a deploy group with new assets (which triggers a deployment)
702

Activate the deploy plan in response to the request
703

Determine which deploy group snapshot of assets is to be deployed to each device and an indication of whether the deploy group of assets is to be deployed to each device at present time according to the deploy plan
704

Send a list of instructions to each device that includes installation instructions for at least one asset of the deploy group of assets
705

Perform, by an updater application on each device, the list of instructions in order to update each device with the deploy group of assets
706

Monitor deployment of the deploy group of assets under the deploy plan based on state information received from devices in the group of devices
707

Pause deployment under the deploy plan after monitoring indicates one or more assets in the deploy group of assets is functioning undesirably
708

Perform one or more remediation actions to address the one or more assets functioning undesirably, including creating a new deploy plan with a new version of the one or more assets
709

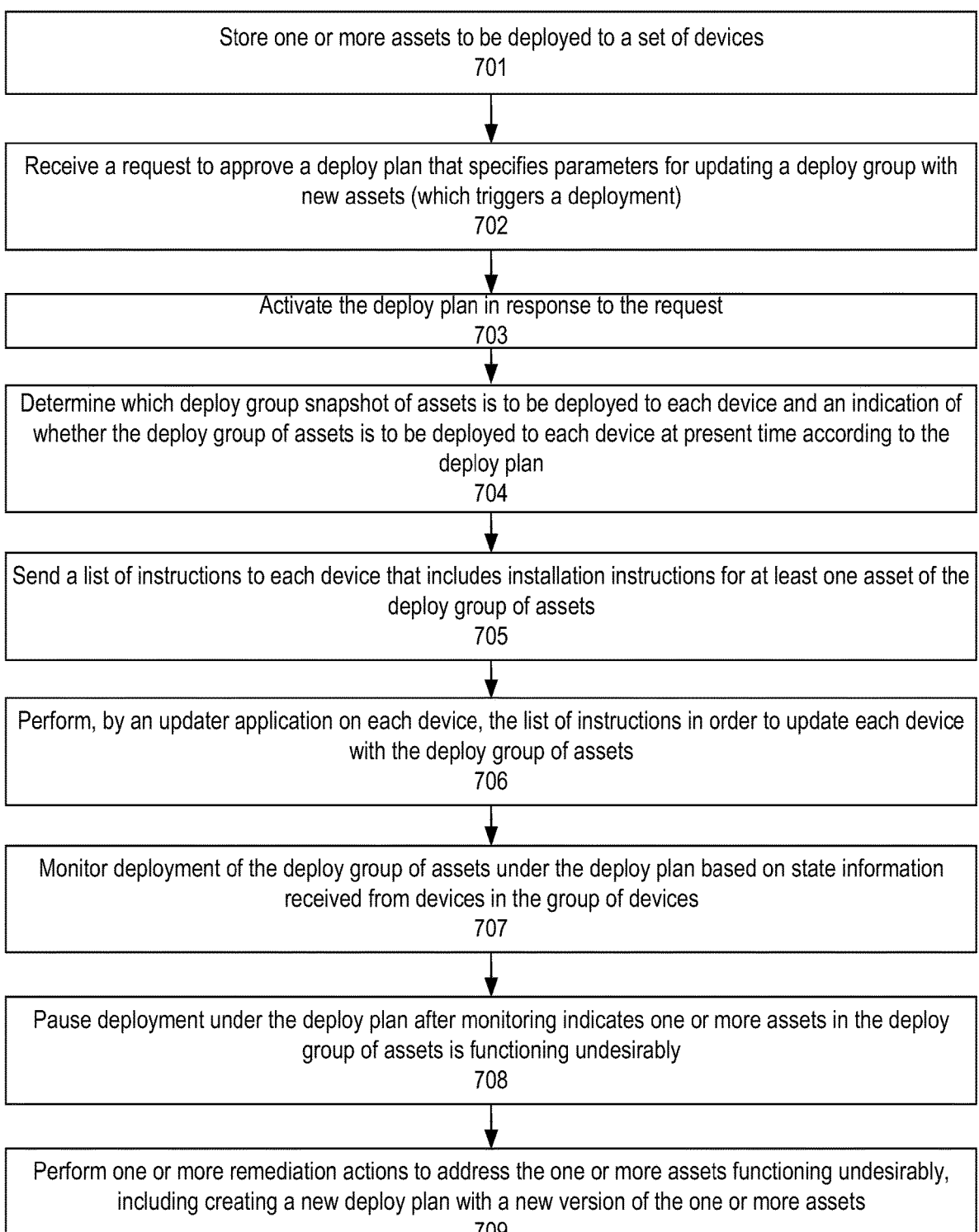

Store one or more assets to be deployed to a set of devices
701

Receive a request to approve a deploy plan that specifies parameters for updating a deploy group with new assets (which triggers a deployment)
702

Activate the deploy plan in response to the request
703

Determine which deploy group snapshot of assets is to be deployed to each device and an indication of whether the deploy group of assets is to be deployed to each device at present time according to the deploy plan
704

Send a list of instructions to each device that includes installation instructions for at least one asset of the deploy group of assets
705

Perform, by an updater application on each device, the list of instructions in order to update each device with the deploy group of assets
706

Monitor deployment of the deploy group of assets under the deploy plan based on state information received from devices in the group of devices
707

Pause deployment under the deploy plan after monitoring indicates one or more assets in the deploy group of assets is functioning undesirably
708

Perform one or more remediation actions to address the one or more assets functioning undesirably, including creating a new deploy plan with a new version of the one or more assets
709

FIG. 7

Obtain the device type for each device in the group of devices
(e.g., a device identifier of the device)
801

Apply a hash function to the device identifier to obtain a hash number
802

Determine whether each device is part of a current stage of the progressive rollout based on the hash number
803

DEPLOYING ASSETS

BACKGROUND

Some payment processing transactions are performed using point-of-sale (POS) terminals that have card readers that allow users to accept in-person payments. More specifically, these merchants allow customers pay and sign on a merchant's POS terminals to enable merchants to process payments made with credit cards, gift cards, and cash. To facilitate this operation, these POS terminals may use a combination of software, including application programming interfaces (APIs) and software development kits (SDKs), and the hardware readers read credit, debit or other payment cards and perform transactions. The software is typically downloaded to the hardware readers from a remote location. In some instances, the merchants have a very large number of devices to which the software must to be downloaded. With such large numbers of devices involved, the merchant needs confidence that deployment has occurred and been successful.

SUMMARY

The present disclosure is directed to deploying applications to a devices, substantially as shown in and/or described in connection with at least one of the figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 7 illustrates of some embodiments of a process for performing a progressive rollout of assets.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described.

Methods and apparatuses for deploying assets are disclosed. In some embodiments, assets such as, for example, applications, (e.g., point-of-sale (POS) applications, payment processing applications, etc.) are deployed to groups of devices (e.g., payment terminals, etc.) according to a deploy plan. In some embodiments, the deploy plan sets forth a progressive rollout in which one or more assets are deployed by a deployment infrastructure to a first subset of devices during a first time period and then deployed to a second and other subsets of devices during a second time period or subsequent time periods, respectfully, that are different than the first time period. Such control of the deployment enables a merchant to gradually rollout new or updated applications or other assets confidently in a reliable and efficient manner.

In some embodiments, a deployment performed according to the deploy plan is observed and monitored to collect status information related to the deployment. The collected status information enables a party to obtain an understanding of health and state of a rollout. The status information can provide an early indication of the health of a deployment while facilitating the prevention of a complete deployment of assets that do not function correctly or as intended and/or enable the performance of a quick remediation of a deployment of bad assets by replacing them with known good assets.

Figure 1:
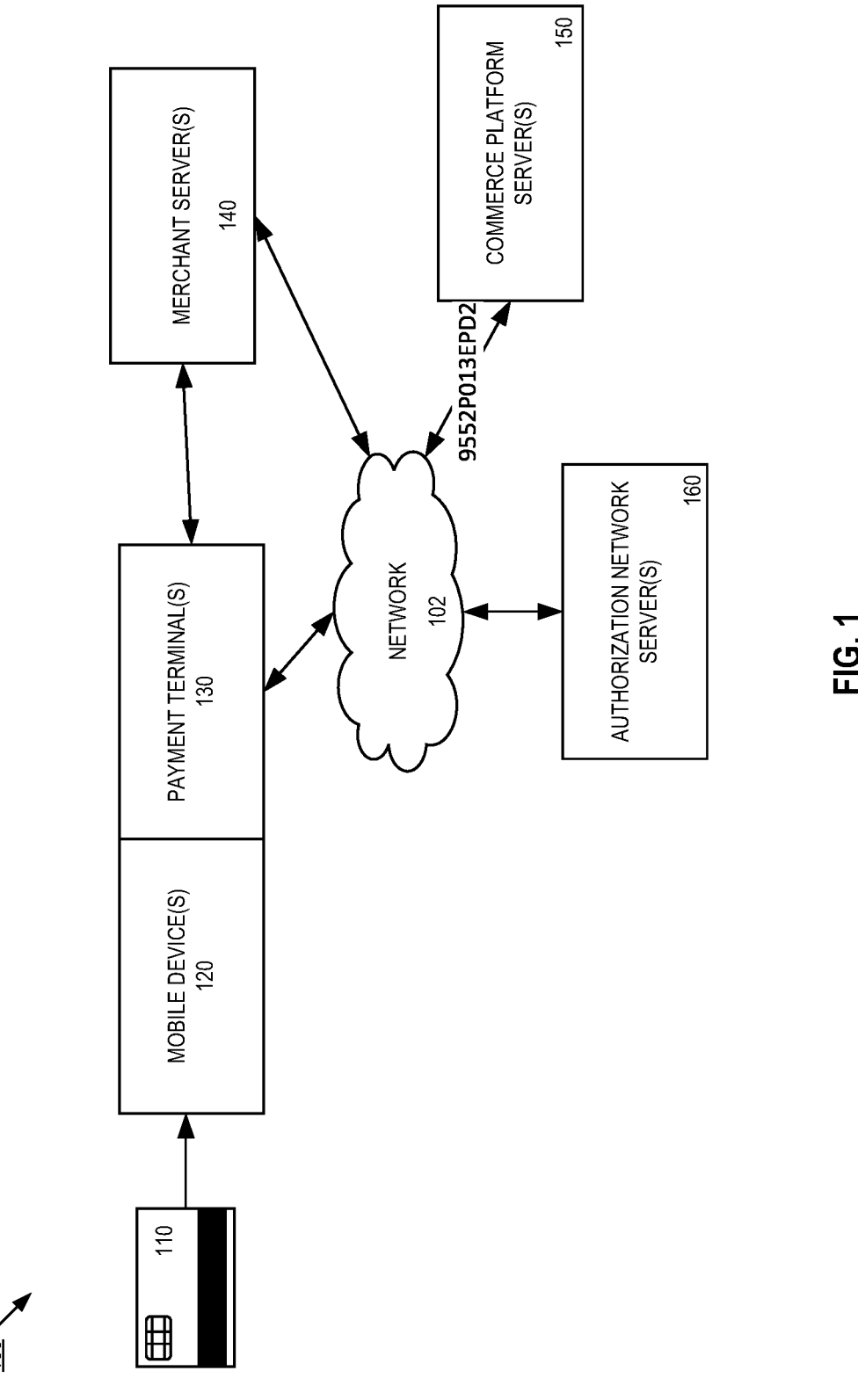
FIG. 1 is a block diagram of an exemplary system architecture for conducting transactions using one or more mobile devices.

FIG. 1 is a block diagram of an exemplary system architecture 100 for conducting commerce transactions. In some embodiments, the system architecture 100 includes one or more payment terminals 130, one or more merchant servers 140, one or more commerce platform servers 150, and one or more authorization network servers 160. In some embodiments, the payment terminals 130 may be computing devices, such as, for example, but not limited to, mobile devices or other hardware devices that execute one or more applications to facilitate processing a payment for a merchant. In some embodiments, the one or more applications and/or software development kits (SDKs) facilitate an ecommerce experience, including one that enables an employee or agent of the merchant to collect payments and complete transactions for goods or services offered by the merchant, as well as take customer orders, process payments, check on inventory, enroll customers into loyalty programs and collect customer reviews. In some embodiments, each application may be a web-based application served by one or more of the merchant server(s) 140 or other computer servers at the direction of the merchant.

Figure 10:
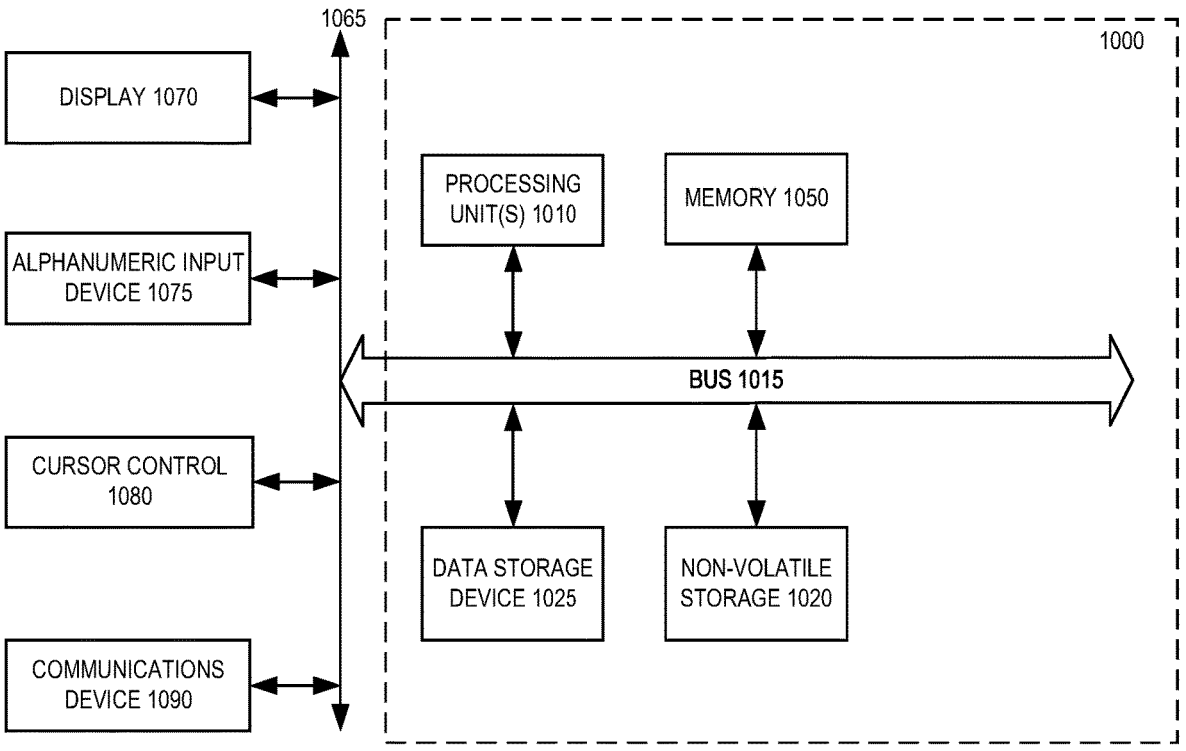
FIG. 10 is one embodiment of a computer system that may be used to support the systems and operations discussed herein.

Furthermore, the merchant server(s) 140, the authorization network server(s) 160, and the commerce platform server(s) 150 are also computing devices, such as server computers, desktop computers, etc., that include typical computing hardware, as illustrated in FIG. 10 below.

In some embodiments, the payment terminal 130 includes a reader device 120. The payment terminal 130 uses the reader device 120 when processing merchant payments with a commerce platform. In some other embodiments, the reader device 120 is a separate device communicably coupled to the payment terminal 130. In some embodiments, the reader device 120 is also a computer processing device that is communicatively coupled with payment terminal over a wireless communications link, such as, for example, but not limited to, a Bluetooth, Zigbee, or other wireless communications link. In some embodiments, the wireless communication link is secured by a secure protocol for the exchange of information, such as utilizing symmetric or asymmetric encryption-based communications. Embodiments of reader devices are illustrated and described in greater detail below in FIG. 11.

A payment processor is one example of a commerce platform. In some embodiments, the mobile reader device 1100 of FIG. 11 can include a card reader 1102 (e.g., an integrated circuit or smart chip reader, a magnetic strip reader, a near field communication reader, etc.), memory 1106, a network interface 1108 for establishing wireless communications (or wired) links, and at least one processor 1104, as well as other hardware components typically associated with mobile reader devices. In some embodiments, the reader device 120 can include one or more personal identification number (PIN) pad reader devices.

Referring back to FIG. 1, the reader device 120 can include a mixture of different kinds of reader devices each communicatively coupled with different merchant POS devices. Furthermore, additional types of reader devices may be used instead of, or in addition to, the PIN pad reader devices and the mobile reader devices discussed herein. In some embodiments, the payment terminal 130 is responsible for collecting consumer payment card data (e.g., EMV card data) by scanning a magnetic strip, reading an integrated circuit, and receiving user input, etc. from or associated with a payment card 110.

Once card data from the payment card 110 is read by a reader device 120, the card data is provided by the reader device 120 to the commerce platform server(s) 150, via the payment terminal 130, for performing one or more payment processing operations. In some embodiments, these payment processing operations can include one or more of tokenizing, authorizing, and/or approving one or more financial aspects associated with the transaction. In some other embodiments, the payment terminal 130 uses one or more applications and/or a mobile software development kit (SDK) (or other application) installed and executing on a payment terminal 130 to which the mobile reader device 120 is part, and/or communicatively coupled to, in order to interact with commerce platform server(s) 150. In either embodiment, the mobile SDK directs communications between the reader device 120, and the commerce platform server(s) 150 handles any received card data in such a way that it is not exposed to any merchant system, thereby preventing merchant payment terminal 130 running an application or the merchant server(s) 140 from being subject to the scope of PCI compliance requirements. Instead, a token is generated by commerce platform server(s) 150 after authorizing a transaction with authorization network server (s) 160 (e.g., card brand systems, issuing bank systems, etc.), and the token is provided from the reader device 120 to the payment terminal 130. In some embodiments, another application executing on the payment terminal 130, such as a merchant's POS checkout application, may then use the token authorizing the transaction to complete the transaction, and further provide the token to merchant server(s) 140 for subsequent use in obtaining remuneration identified by the token by interacting with the commerce platform server (s).

Example embodiments for using reader devices with payment terminals are described in U.S. patent application Ser. No. 15/997,416, filed on Jun. 4, 2018, titled "Managed Integrated Payment Environment," the disclosure of which is incorporated by reference in its entirety. Furthermore, some embodiments of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

Note that there may be merchant server(s) may be associated with multiple payment terminals (e.g., payment terminal 130), and multiple reader devices (e.g., reader device 120) in the system architecture 100.

In some embodiments, the payment terminal 130, the reader device 120, merchant server(s) 140, commerce platform server(s) 150, and authorization network server(s) 160 can be coupled to a network 102 and communicate with one another using any of the standard protocols for the exchange of information. In some embodiments, one or more of the payment terminal 130, the reader device 120, merchant server(s) 140, commerce platform server(s) 150, and authorization network server(s) 160 can be incorporated into the same physical or logical system, or different physical or logical systems. Alternatively, one or more of the payment terminal 130, the reader device 120, merchant server(s) 140, commerce platform server(s) 150, and authorization network server(s) 160 can reside on different local area networks (LANs), wide area networks, cellular telephone networks, etc. that may be coupled together via the Internet but separated by firewalls, routers, and/or other network devices. In some embodiments, the commerce platform server(s) 150 may reside on a single server, or be distributed among different servers, coupled to other devices via a public network (e.g., the Internet) or a private network (e.g., LAN). Various other network configurations can be used including, for example, hosted configurations, distributed configurations, centralized configurations, etc. Furthermore, in some embodiments, the payment terminal 130, the reader device 120, merchant server(s) 140, commerce platform server(s) 150, and authorization network server(s) 160 can communicate with one another via network 102 using any of the protocols for the exchange of information, such as secure protocols including TLS, SSL, SSH, etc.

Progressive Rollouts and the Deployment of Assets to Devices

In some embodiments, the deployment or rollout of one or more of the POS applications and system application to the payment terminals can be controlled. The POS applications can include new POS applications, updated versions of previously downloaded POS applications, or replacement versions of previously downloaded POS applications. The deployment can include an SDK of the payment terminal and/or the reader application for operating a reader device. In some embodiments, the reader application is part of the SDK. In some embodiments, developers of the application and/or their associated merchants can control the deployment of the POS applications. In some embodiments, the control is performed by using a set of application programming interfaces (APIs), which is described in further detailed below.

In some embodiments, the control of the deployment is through the use of a deployment plan specified by the developers of the application and/or their associated merchants. The deployment plan can specify which of the payment terminals (e.g., card readers, etc.) are to receive which POS applications, which the locations and/or merchants locations having payment terminals are to receive POS application(s), the time period (e.g., over two weeks) during which the deployment is to take place, the type of payment terminals or readers that are part of a particular deployment, the percentage of a set of payment terminals that are to receive the POS application(s) (e.g., ten percent of a merchant's payment terminals), configuration or setting changes involved with one or more applications (previously deployed or currently being deployed), including specific information about the POS applications (e.g., which POS application of a group is launched first and which is launched later, which application is in the background or foreground, etc.), etc. By using a deployment plan, a developer or merchant can employ a smaller beta deploy group for some stores, locations, etc., to test the operation of the deployed assets (e.g., POS applications) as part of a gradual rollout. Furthermore, the use of the deploy plan enables a developer or merchant to customize the rollout of the POS application(s) based on information corresponding to the different locations.

In some embodiments, the use of a deploy plan also allows a developer or merchant to alter or halt the deployment of one or more POS applications. In some embodiments, the deployment can be altered, halted or cancelled by the developer and/or merchant. This control of the deploy plan can be performed where the developer/merchant sees errors (e.g., a high error rate) in the operation of POS applications. In some embodiments, the stopping of a deployment is accomplished by withdrawing the deploy plan. In some other embodiments, the stopping of a deployment is accomplished by changing the deploy plan.

Figure 2:
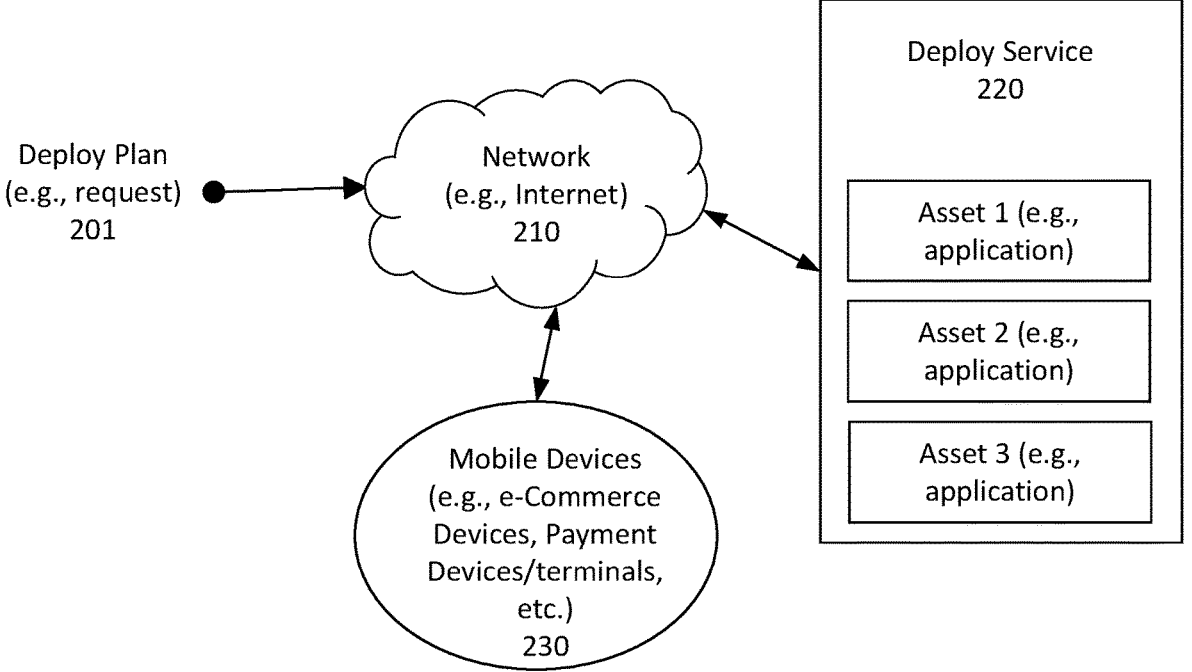
FIG. 2 illustrates some embodiments of a framework for deploying applications to a mobile device (e.g., a payment terminal).

FIG. 2 illustrates some embodiments of a framework for deploying applications to a mobile device (e.g., payment terminal, etc.). Referring to FIG. 2, a deploy service 220 receives a deploy plan 201 via a network communication (e.g., Internet communications) and deploys one or more of applications 1-N to the mobile devices 230. In some embodiments, deploy service 520 can be performed by processing logic that may include hardware (circuitry, dedicated logic, etc.), software (such as is run on a general-purpose computer system or a dedicated machine), firmware, or a combination thereof. In some embodiments, deploy plan 201 can update the state of deploy service 220.

The deploy plan 201 can be part of a request received over a network from a developer and/or merchant (e.g., via merchant server(s) 140). In some embodiments, deploy service 220 can be part of commerce platform server(s) 150. In some embodiments, the mobile devices 230 include or are coupled to one or more readers (e.g., card readers, etc.).

Figure 3:
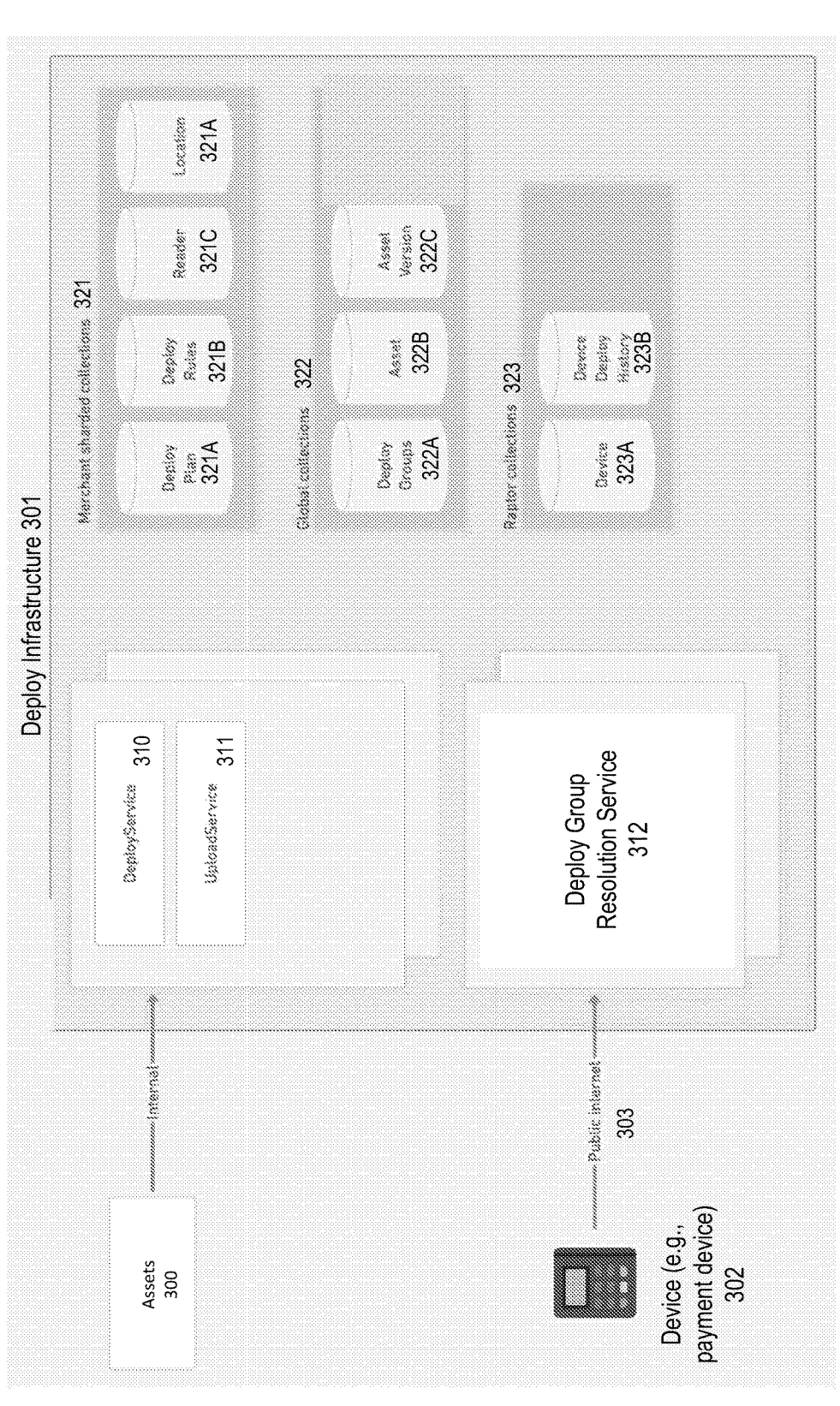
FIG. 3 illustrates some embodiments of a deploy infrastructure.

FIG. 3 illustrates some embodiments of a deploy infrastructure 301. In some embodiments, the deploy infrastructure 301 acts as a device management service. In some embodiments, the deploy infrastructure 301 is part of a commerce platform, such as, commerce platform service 150. The operations of the deploy infrastructure 301 can be performed by processing logic that may include hardware (circuitry, dedicated logic, etc.), software (such as is run on a general-purpose computer system or a dedicated machine), firmware, or a combination thereof.

Referring to FIG. 3, the deploy infrastructure 301 includes a number of services including, but limited to a deploy service 310, an upload service 311, and a deploy group resolution service 312. In some embodiments, the deploy service 310 controls assets (e.g., applications) for deployment to devices, such as device 302 (e.g., a payment device) via a network connection such as the internet 303. In some embodiments, the deploy service 310 coordinates deployment of asset versions in a deploy group under a deploy plan and according to deploy rules. In some embodiments, the upload service 311 uploads assets 300 for deployment. In some embodiments, each of these assets has one or more asset versions. In some embodiments, the deploy infrastructure 301 includes the deploy group resolution service 312 to determine applications and other assets to be provided to devices, such as device 302.

In some embodiments, the deploy infrastructure 301 includes a number of collections of information and files including, a merchant sharded collections 321, a global collections 322 and a device data collections 323. In some embodiments, the global collections 322 include the deploy groups 322A, assets 322B, and asset version 322C. The deploy groups 322A describe a combination of assets and versions that are the desired state for any device that is subscribed to a particular deploy group. In some embodiments, every device is part of one deploy group of devices that are to be deployed one deploy group of assets. In some embodiments, devices cannot belong to more than one deploy group. The assets 322B and asset versions 322C define specific assets that can be deployed. For example, each application has a unique asset document. This document does not contain any version information; however, it does contain application name, owner information and permissions for which other users may use this asset. Asset version 322C defines a specific version of an asset. In some embodiments, some assets require the asset version to be securely signed using a signing service of the commerce platform before being deployed to devices.

In the merchants collections 321, the deploy plans 321A describe what is being deployed to devices such as the device 302. In some embodiments, a deploy plan of assets is created by specifying a list of one or more assets and their versions (to deploy multiple assets at a time) and a deploy group of devices contain a group of devices that will receive that set of assets. In some embodiments, the deploy plan includes deploy instructions. These instructions can specify a progressive rollout, including a percentage of the devices that are to receive the rollout of the assets at different times. In some embodiments, additional deploy instructions can include information specifying a time of an update of assets to be deployed to devices, an installation type, and an indication of whether the update is critical or not. In some embodiments, the time of update includes a specific time of day (e.g., midnight) or days. The deploy rules 321B describe how devices are assigned to deploy groups. In some embodiments, upon registration, the deploy infrastructure 301 will look up which deploy group of devices should belong to the deploy rules 322B. In some embodiments, the deploy rules 321B can be merchant based and/or location based. In some embodiments, the deploy rules 321B access reader database 321C and location database 321D to lookup the particular configuration and assets for a particular device that is designated to receive a deploy group of assets.

In some embodiments, the device data 323 includes a database of all the devices to store data that specifies all the assets in asset versions that are currently installed on the device. The device deploy history database 323B includes an indication of the deploy history for each of the devices. In some embodiments, the history in the device deploy history database 323B is updated every time a deploy plan is created, and each record in the history collection 323B contains the state of the deploy group and version with which its associated.

Figure 4:
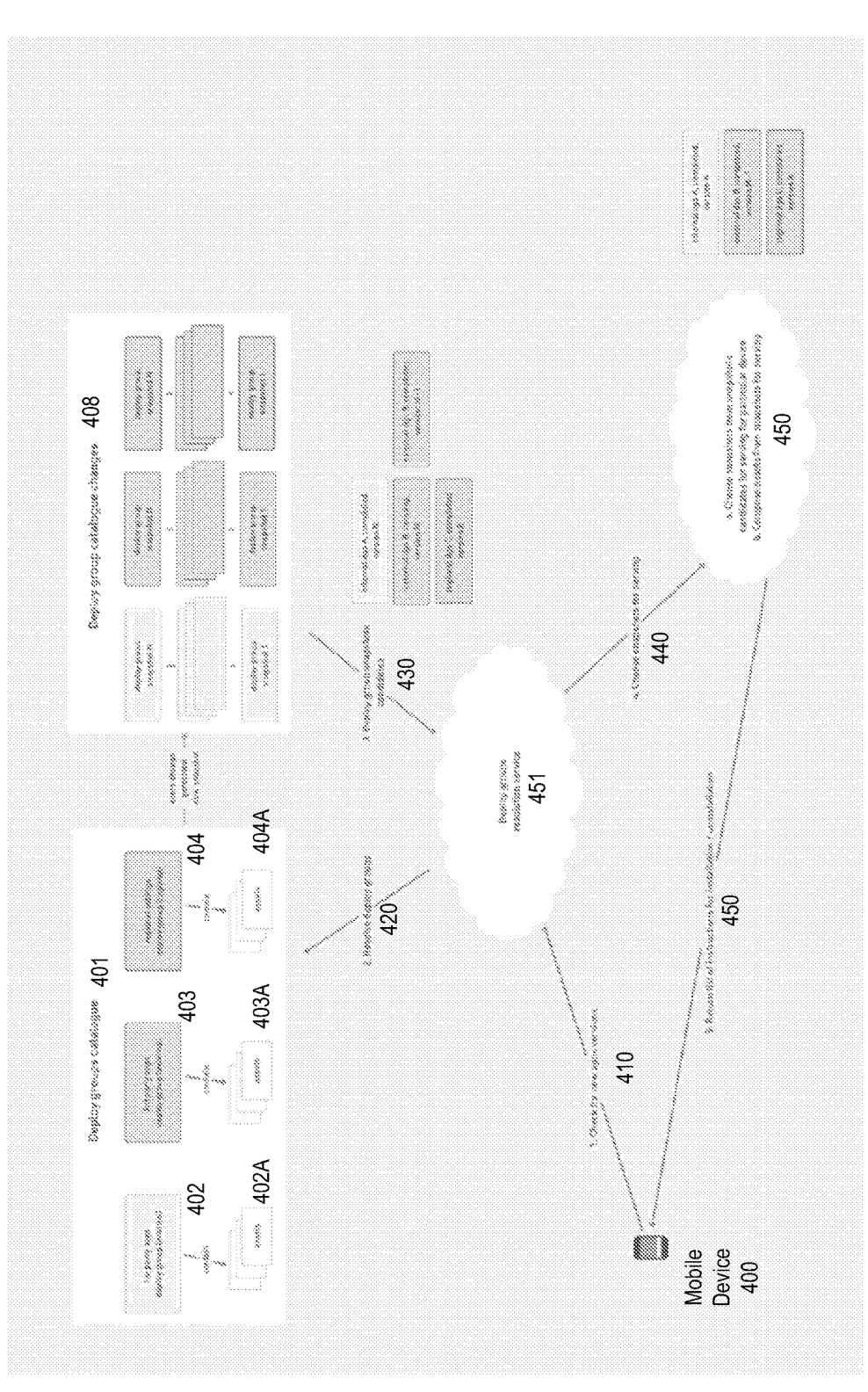
FIG. 4 illustrates operation of some embodiments of a deploy infrastructure.

FIG. 4 illustrates operation of some embodiments of a deploy infrastructure, such as, for example, deploy infrastructure 301 of FIG. 3. The operations can be performed by processing logic that may include hardware (circuitry, dedicated logic, etc.), software (such as is run on a general-purpose computer system or a dedicated machine), firmware, or a combination thereof.

Referring to FIG. 4, a deploy groups catalogue 401 includes one or more deploy groups of assets. In some embodiments, one type of deploy group include first-party deploy group of one or more assets 402A. In some embodiments, the assets 402A comprise one or more applications or other files (e.g., configuration files, etc.). Another set of deploy groups catalogue 401 includes the third-party applications deploy group 403 having assets 404. The deploy group catalogue 401 also includes a regional settings display group 404 with one or more assets 404B for regional deploy groups of devices.

In some embodiments, the first party deploy group 402 includes internally generated assets. For example, in the case the deploy infrastructures is part of a commerce platform, such assets may be generated by the commerce platform itself. For example, the first party deploy group 402 may include applications from a payment processor designed to handle payment processing operations as part of ecommerce transactions, such as, for example, a reader application for using a reader device and/or an SDK.

In some embodiments, the third-party deploy group 403 includes assets that are externally generated from the commerce platform. For example, in some embodiments, the third-party deploy group 403 includes applications generated developers and/or merchants that may perform POS operations. Such applications may be uploaded into the commerce platform for deployment by the deploy infrastructure 301 of the commerce platform.

In some embodiments, changes generated to a deploy group of assets are captured as a snapshot. For example, if a deploy group includes three assets and one of the assets is updated to create another version of that asset, a snapshot is created with the updated deploy group containing the same set of assets but with the one asset with the updated version. FIG. 4 illustrates three sets of deploy groups snapshots, one for each of the deploy groups in catalogue 401. Note that there may be more or less than three sets of snapshots of deploy groups.

In some embodiments, a mobile device such as mobile device 400 sends a message (410) to check for new application versions to the deploy groups resolution service 451. In some embodiments, the deploy groups resolution service 451 determines which snapshots are designated for deployment to mobile device 400 in response to this message (410). Therefore, in response receiving the message to check for new applications (410) from mobile device 400, the deploy groups resolution service 451 resolves the deploy groups (420) and obtains the deploy groups snapshot candidates (430) from deploy groups catalogue changes 408. As an example, the snapshot candidates could include snapshots related to the first party (internal deploy groups versions, and external deploy group B version N, regional deploy group C version N as well as another external deploy group version N−1). In other words, the deploy group resolution service 451 may obtain snapshots that are to be prepared for the mobile device 400.

The deploy groups resolution service 451 chooses which snapshots for serving (440). In this case, the deploy groups resolution service 451 chooses snapshots from the snapshot candidates for serving for a particular device and composes the assets from the snapshots for serving. In some embodiments, the selection of snapshots for serving to the mobile device 400 is based on the device type and location. For example, while a deploy group includes a snapshot that is prepared for the mobile device 400, the deploy group resolution service 451 can determine that the mobile device 400 is not to receive the snapshots associated with the deploy group at this time. That is, as part of a progressive rollout, while the mobile device 400 may be designated to receive assets under the rollout, the deploy plan specifies when the mobile device 400 is to receive the assets being deployed and dictates whether the deploy group resolution service 451 serves one or more the snapshots to mobile device 400 at this particular time.

In one embodiment, the device ID of the mobile device 400 is used to determine whether snapshots are to be provided during this stage of a rollout. In some embodiments, a hash function is applied to a device ID and the resulting hash number is compared against data in the deploy plan to see if the mobile device 400 is to receive the deploy group of assets at this current stage of the rollout. For example, if the deploy plan is currently only providing the snapshots of a deploy group of assets to a certain percentage (e.g., 5%) of the devices designated to receive the rollout during a particular time period, then mobile device 400 may not be part of that percentage and thus would not receive the snapshot associated with the deploy plan during this time period.

In some embodiments, the deploy group resolution service 451 also compares the state of the mobile device 400 with respect to the snapshots to be served to determine which instructions should be provided to the mobile device 400 to obtain the deploy group of assets. For example, it is possible that one or more of the assets in the snapshots to be served to the mobile device 400 is already on the mobile device 400. In such a case, then the deploy group resolution service 451 does not need to serve those particular assets to the mobile device 400.

After determining which assets from the snapshots are to be served, the deploy groups resolution service 451 returns a list of instructions to the mobile device 400 (460), including instructions to install and/or uninstall applications or other assets that may be on the mobile device 400. In some embodiments, the instructions indicate when the mobile device 400 is to obtain the deploy group of assets and perform the installation and/or uninstall of the assets. In some embodiments, the instructions include a link to the deploy group of assets of enable the mobile device 400 to obtain those assets. In some embodiments, the mobile device 400 obtains those assets by downloading those assets from a designated location. In some embodiment, the designated location is indicated by a URL link or some other resource location indication.

In some embodiments, in response to the instructions, an updates application on the mobile device 400 obtains the deploy group of assets and installs them on the mobile device 400 and uninstalls any assets that the instructions indicate should be uninstalled.

Figure 5:
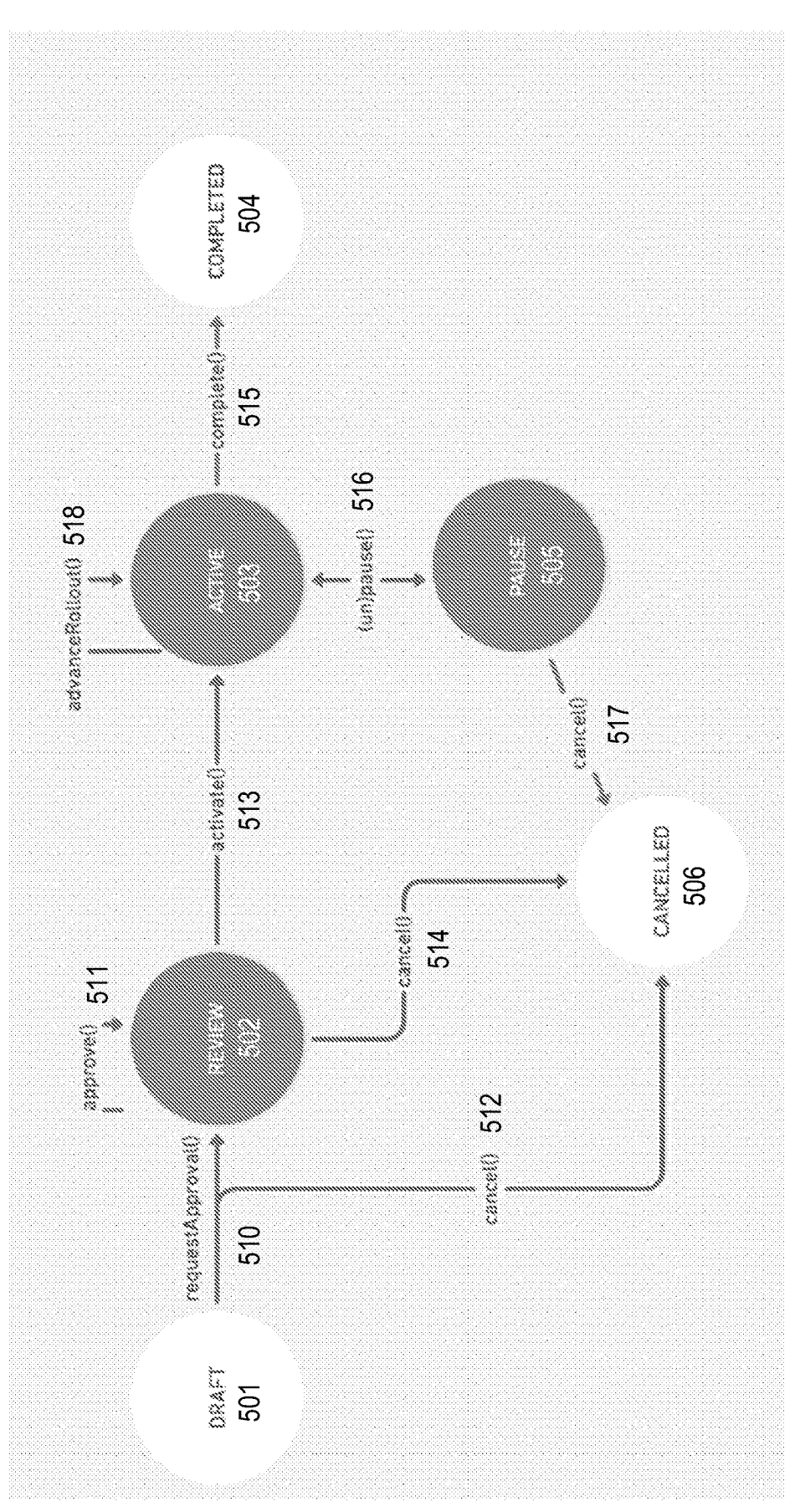
FIG. 5 illustrates some embodiments of a state diagram of a deploy plan.

FIG. 5 illustrates some embodiments of a state diagram of a deploy plan. The operations of the state diagram can be performed by processing logic that may include hardware (circuitry, dedicated logic, etc.), software (such as is run on a general-purpose computer system or a dedicated machine), firmware, or a combination thereof.

Referring to FIG. 5, the state diagram has six states. The draft state 501 is a state in which a one or more deploy plans are in draft. The review state 502 is where a deploy plan has been created and a request has been received to approve that particular deploy plan. The active state 503 is the state in which a deploy plan is active and a rollout of a deployment of assets to mobile devices can occur. That is, in the active state 503, the deploy plan can be utilized to deploy groups of assets to mobile devices as part of a rollout (e.g., a progressive rollout, a partial rollout, etc.). The completed state 504 is a state that is entered after a deploy plan has been fully completed and the assets fully deployed. The pause state 505 is a state in which an active deploy plan has been paused. In some embodiments, a deploy plan may be paused for a number of reasons such as, for example, monitoring of the deployed assets indicates that one or more of the assets is not functioning as desired. The cancelled state 506 is a state that is entered when a deploy plan is cancelled. A deploy plan may enter the cancelled state 506 from the draft state 501, the review state 502 or the pause state 505.

More particularly, when in draft state 501, multiple drafts of deploy plans may be undergoing creation. A particular deploy plan in draft state 501 can be cancelled (control signal 512) and the deploy plan then enters the cancelled state 506. Note that once in the cancelled state 506, a deploy plan cannot transition to any other state. The deploy plan may be cancelled for a number of reasons. For example, a deploy plan can be cancelled from the draft state 501 because another, more up-to-date deploy plan is taking its place or a new version of one or more of the deploy plan assets has been created.

While many deploy plans may be in the draft state 501, one particular deploy plan may be selected to proceed when a request for its approval (control signal 510) occurs. In this case, the deploy plan transitions into the review state 502. Note that in review state 502, only one deploy plan is present, as opposed to the multiple deploy plans that may be present in draft state 501. While in review state 502, a deploy plan undergoes a process in which one or more approvals (control signal 511) are obtained and are necessary for the deploy plan to transition to the active state 503. In some embodiments, the approvals (control signal 511) are done by individuals (or teams of individuals). If the approvals (control signal 511) cannot be obtained, the deploy plan is cancelled (control signal 514) and enters the cancelled state 506. On the other hand, if the requisite approvals (control signal 511) are obtained while the deploy plan is in the review state 502, the deploy plan is activated (control signal 513) and transitions to the active state 503. In some embodiments, the deploy plan is activated by one or more individuals and is a manual activation.

While in the active state 503, the deploy plan may be performed. When performing a deploy plan, one or more subsets of devices are able to receive the deploy group of assets. This can be according to a progressive rollout of the deploy group of assets specified in the deploy plan. In some embodiments, the group of devices receiving a group of assets under the deploy plan are based on device type (e.g., number) and/or location. Note that a deploy plan can specify that all the devices are to be deployed the assets during the same time period (i.e., the deploy plan is not progressive and not partial). While in the active state 503, the rollout may advance to stages 518 until there's an indication that the deployment has completed (control signal 515). At this point, the deploy plan transitions to the completed state 504.

If it is determined that during the rollout that there is some type of error or one or more the assets is not functioning as expected or as desired, the deployment is to be paused (control signal 516). If the deploy plan is to be paused, the deploy plan transitions from the active state 503 to the pause state 505. However, if it is determined that the deploy plan is no longer going to be paused, then the deploy plan transitions back from the pause state 505 to the active state 503.

In some embodiments, the indication of whether to enter the pause state 516 is a manual process performed by one or more individuals. In some other embodiments, the determination to enter the pause state 516 is determined by an automated process. In some embodiments, the determination of whether to enter the pause state 505 from the active state 503 is based on monitoring of the deployment and obtaining feedback and other state information from devices to which the deploy group of assets has been deployed.

After entering the pause state 505, if there is a determination to cancel the deploy plan, cancel control signal 517 is issued and the deploy plan transitions to the cancelled state 506. Once entering the cancelled state 506, the deploy plan cannot return to the active state 503. In some embodiments, if a deploy plan is actively being deployed and is subsequently paused and then enters the cancel state 506, the only way to start the deployment of a group of assets again is to issue a new deploy plan.

In some embodiments, the complete (515) and cancel (517) control arrows are used to guarantee consistency in the system (i.e., to guarantee the invariant that only one deploy plan is in such a state).

Figure 6:
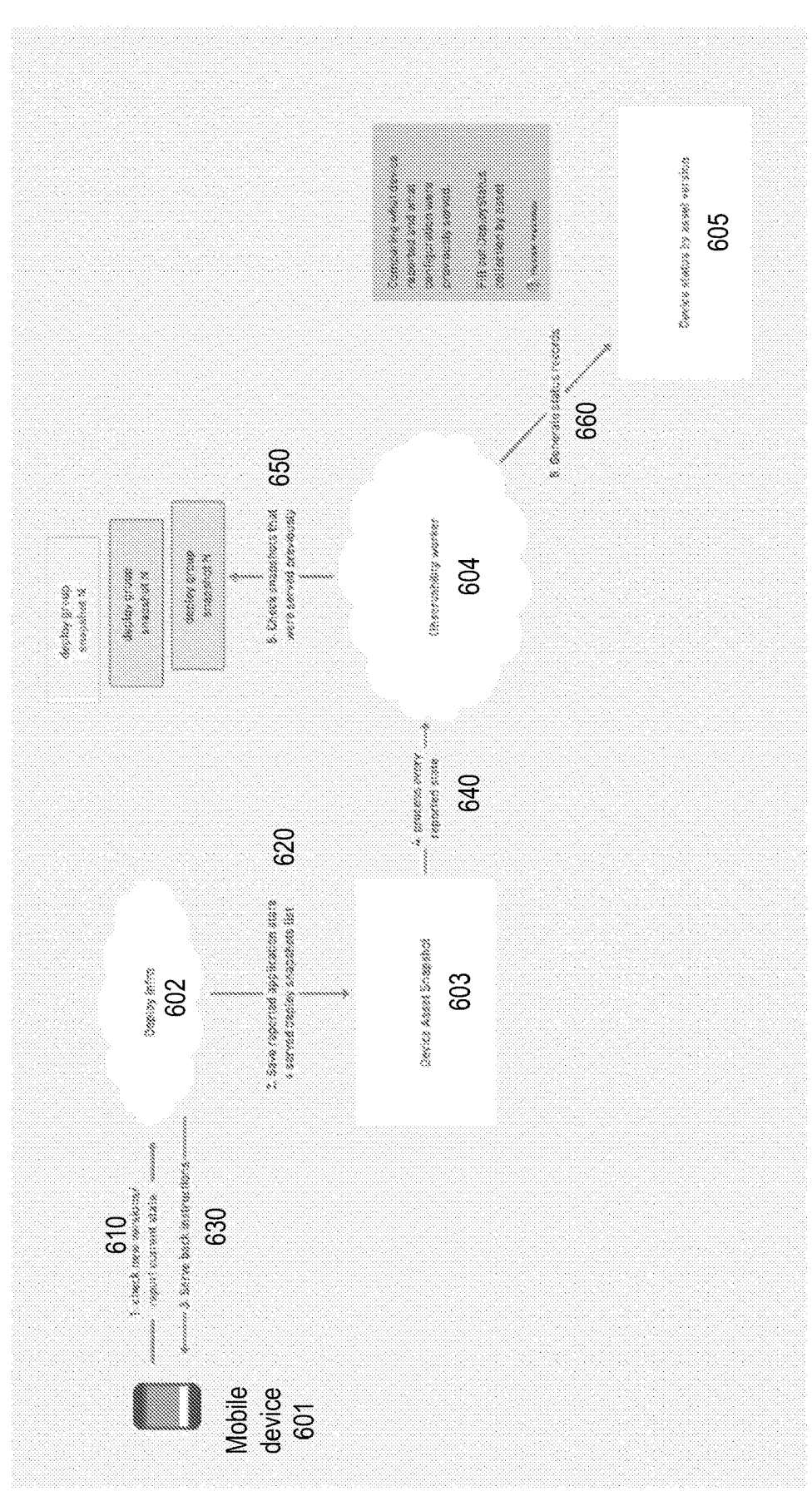
FIG. 6 is a data flow diagram of some embodiments of a process for monitoring deployments.

FIG. 6 is a data flow diagram of some embodiments of a process for monitoring deployments. In this case, monitoring occurs for each device asset snapshot and for device deploy status by asset version. The process can be performed by processing logic that may include hardware (circuitry, dedicated logic, etc.), software (such as is run on a general-purpose computer system or a dedicated machine), firmware, or a combination thereof.

Referring to FIG. 6, a mobile device 601 checks in with the deploy infrastructure 602. In some embodiments, check-in messages from the mobile device 601 are used to request for new versions of applications as well as to report its current state. In response to the check-in message 610, the deploy infrastructure 602 saves the reported application state and the served deploy snapshot list 620. The served deploy snapshot lists 620 are the snapshots that were served to the mobile device 601. In some embodiments, the reported state, including the list of the served deploy snapshots, are saved in device asset snapshot storage 603.

An observability worker 604 consumes data regarding the deployment and creates storage status information regarding the deployment. In some embodiments, the observability worker 604 receives and processes every reported state from a mobile device (640). In response to each state, the observability worker 604 checks the snapshots that were served previously (650) as well as generate status records (660). In some embodiments, the observability worker 604 compares what the device reported against the configuration was previously served. Based on this information, the observability worker 604 generates a status record (660) that is stored in the device status by asset version storage 605. In some embodiments, each time the observability worker 604 generates a status record that is added or updated in the device status by asset version storage 605, a transformation or population of another collection of deploy status by asset occurs. In some embodiments, the observability worker 604 is not only looking at the current assets and snapshots but is also looking at assets previously provided to the mobile device 601 to understand what has happened with those assets on the device.

By storing the device status by asset version, the life cycle of a device and all the assets and their versions may be stored and subsequently examined. In some embodiments, device status by asset versions storage 605 stores a device ID for each device, such as the mobile device 601, as well as an indication of each asset and its asset version on that device. In this manner, all the installations (and uninstallations) may be tracked.

FIG. 7 illustrates of some embodiments of a process for performing a progressive rollout of assets. The process can be performed by processing logic that may include hardware (circuitry, dedicated logic, etc.), software (such as is run on a general-purpose computer system or a dedicated machine), firmware, or a combination thereof. In some embodiments, the process is performed by a deployment infrastructure. The deployment infrastructure can be part of a commerce platform (e.g., one or more commerce servers, etc.).

Referring to FIG. 7, the process begins by processing logic storing one or more assets to be deployed to a set of devices (processing block 701). In one embodiment, each of the deployed groups has one or more assets. In some embodiments, the assets may include a new application, a new version of a previous existing application, or a previously deployed, existing application with a configuration change. In some embodiments, the assets comprise files other than applications. These can include configuration change files. In some embodiments, the application comprised an application for processing commercial transaction.

In some embodiments, storing different deploy groups comprises maintaining snapshots of different deploy groups. In some embodiments, each snapshot represents a new state of a deploy group. The new state can result from a change that has occurred in one or more of the assets in the deploy group. In some embodiments, a snapshot represents the most recent version of a deploy group. To that end, the snapshot captures the evolution of a deploy group into a new version.

Next, processing logic receives a request to approve a deploy plan that specifies parameters for updating a deploy group with new assets (processing block 702). In some embodiments, this triggers deployment. In some embodiments, the group of devices are payment devices. In some embodiments, the deploy plan specifies a subset of the payment devices in a group of payment devices that are to receive the asset versions (e.g., an application). The deploy plan may specify a particular groups or subsets of devices that are supposed to receive a deploy group of assets during certain predetermined period of times. For example, if there is a set of devices that are receive a particular set of asset versions, the deploy plan can specify that a first subset of the devices receives the deploy group of assets during a first time period, a second group of devices to receive asset versions during a second time period different than the first time period, etc. In some embodiments, a deploy plan can only deploy to one deploy group at a time. In some embodiments, the group of devices comprises payment devices for use in processing payments for commercial applications, and the deploy group of assets comprises an application involved in handling at least a portion of the commercial transaction process (e.g., an application for processing payments, etc.).

After receiving a request to approve a deploy plan, process logic subsequently activates the deploy plan (processing block 703). In some embodiments, the deploy plan is activated after it's been reviewed and approved. Thereafter, the deploy plan transitions to an active state. In some embodiments, if a deploy plan is reviewed and approved and there hasn't been a cancellation of the deploy plan, the deploy can be activated and transition to the active state. In some embodiments, the deploy plan is a deployment of a snapshot (e.g., the most recent version of a deploy group of assets). In some embodiments, the approval of the deploy plan is performed by one or more individuals. In some other embodiments, the approval of the deploy plan is performed by a system automatically.

In some embodiments, the deploy plan includes two components: a list of asset versions and an indication of whether the particular asset and with its asset version is to be installed or uninstalled.

After activating a deploy plan, processing logic determines which deploy group snapshot of assets is to be deployed to each device and whether the deploy group of assets is to be deployed to each group at the present time according to the deploy plan (processing block 704). In some embodiments, this determination is made in response to receiving a request from a device for any updates to the assets that it currently has. In other words, the process receives a request from a device and the process determines if that device is going to be receiving assets associated with the rollout at the present time. It may be the case that the device is part of the progressive rollout, but is not designated to receive the group of assets during this stage of the rollout. In some embodiments, the request from the device is generated by an updater application that updates applications on the device. An example of an updater is described in further details below. In some embodiments, determining whether the deploy group of assets is to be deployed to the device at the present time is based on the device type and the location of the device.

In some embodiments, determining which set of assets is to be deployed to the device includes selecting the snapshots and determining which of the selected snapshots to provide to the device.

Figure 8:
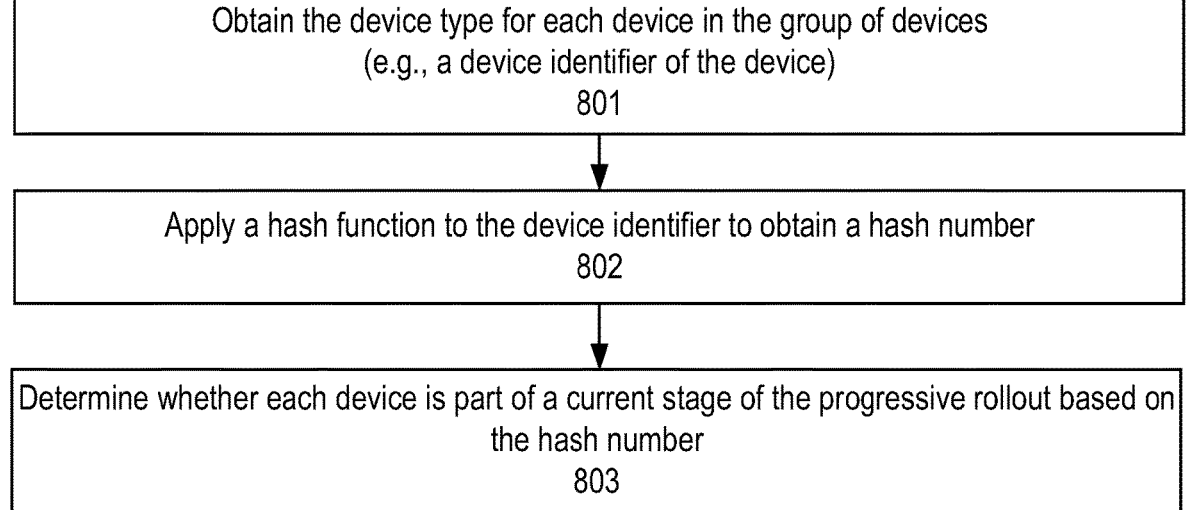
FIG. 8 illustrates some embodiments of process for determining whether a deploy group snapshot is to be served to a particular device at the present according to the deploy plan.

FIG. 8 illustrates some embodiments of process for determining whether a deploy group snapshot is to be served to a particular device at the present according to the deploy plan. The process can be performed by processing logic that may include hardware (circuitry, dedicated logic, etc.), software (such as is run on a general-purpose computer system or a dedicated machine), firmware, or a combination thereof. In some embodiments, the process is performed by a deployment infrastructure. The deployment infrastructure can be part of a commerce platform (e.g., one or more commerce servers, etc.).

Referring to FIG. 8, the process begins by processing logic obtaining the device type for each device in group of devices (processing block 801). In some embodiments, obtaining the device type comprises obtaining the device identifier of the device. Next, processing logic applies a hash function to the device identifier to obtain a hash number (processing block 802) and then determines whether the device is part of the current stage of the progressive rollout based on the hash number (processing block 803). In some embodiments, determining whether the device is part of the progressive rollout based on the hash number comprises checking the deploy plan to see if the hash number is included in a range of hash numbers that are designated to receive the deploy group of assets at the present time. If not, then the snapshots are not provided to the device (though it may provide those snapshots at a later time when the device checks into the system again).

Referring back to FIG. 7, in some embodiments, selecting a snapshot and determining which out of the selected snapshots to provide to a device comprises comparing the state of the device to what is in the snapshot and generating. After determining that the asset versions is to be provided to a device, processing logic generates and sends a list of instructions to the device that includes installation instructions for at least one asset of the deploy group of assets (processing block 705). The instructions can include applications to uninstall, if any, as well as configuration changes for applications. In some embodiments, processing logic compares the state of the device to what is in the snapshot and generates and sends instructions for installing or uninstalling one or more applications based on the current state of the device. In some embodiments, the instructions comprise a pre-signed resource locator (e.g., URL link) to enable the devise to access the group of assets.

After sending the list of instructions, processing logic of the device can perform the list of instructions in order to update the device with the deploy group of assets (processing block 706). In some embodiments, the list of instructions performed by an updater application running on the device. In some embodiments, the updater application is permitted access and downloads the assets in the deploy group based on the instructions. In some embodiments, the assets are downloaded in the form of binaries. At this point, the rollout to the device has competed and the device is able to utilize the group of assets that were part of the deploy plan.

During the deployment, processing logic monitors the deployment of the group of assets under the deploy plan (processing logic 707). In some embodiments, the processing logic monitors the deployment based on status information received from the devices in the group of devices receiving the group of assets under the deploy plan. In some embodiments, the processing logic receives the state information when each of the devices performs a check-in with the system. As part of monitoring, processing logic may determine that one or more of the assets in the deploy group of assets that are part of the deploy plan is functioning undesirably (e.g., an application has a bug, an application generates permission violations, an application functions incorrectly, etc.). In other words, processing logic can determine that the rollout is unhealthy. In some embodiments, the processing logic determines the rollout is unhealthy based on status information collected from the mobile devices. In some embodiments, each snapshot has a corresponding object that contains information about the ramp of the snapshot or the deploy plan in which it's a part. The information can be quantitative information (e.g., the number of devices are in the deploy group of devices, the number of these devices that have received snapshot assets, the number of these devices that have been successfully updated to the latest state, etc.) and health information (e.g., statistics for each snapshot as to the operation of its assets, deploy status information, etc.)

Processing logic can pause deployment of a deploy plan after monitoring indicates the one or more assets in the deploy group of assets is functioning undesirably (processing block 708). In other words, processing logic can pause the deploy plan after activation if monitoring reveals there are some issues that have occurred with the deployed assets. For example, issues may include a spike in bad transactions. In such a case, when the deploy plan has been paused, the devices designated to receive the deploy group of assets will not get it if they have not already received those assets. If the deploy plan is paused, the deploy plan can either go back to an active state or a cancellation state. In some embodiments, once a deploy plan has been paused, the deploy plan is not activated again until there is a new deploy plan.

In some embodiments, processing logic performs one or more remediation actions to address the one or more assets functioning undesirably (processing block 709). In some embodiments, processing logic performs one or more remediation actions by creating a new deploy plan with a new version of the one or more assets in the deploy group of assets. In such a case, assets that was functioning incorrectly are updated to a version that performs as desired. Also, in some embodiments, when creating a new deploy plan, the groups of devices set to receive the new deploy plan as part of a progressive rollout can include the same devices that received the bad assets of the previous deployment. This can be achieved by having the same set of device IDs identified in the deploy plan and using the same hash function as previously used in the previous deploy plan with the bad assets. In some embodiments, the remediation includes replacing one version of an asset with a newer or higher version of the assets.

Figure 9:
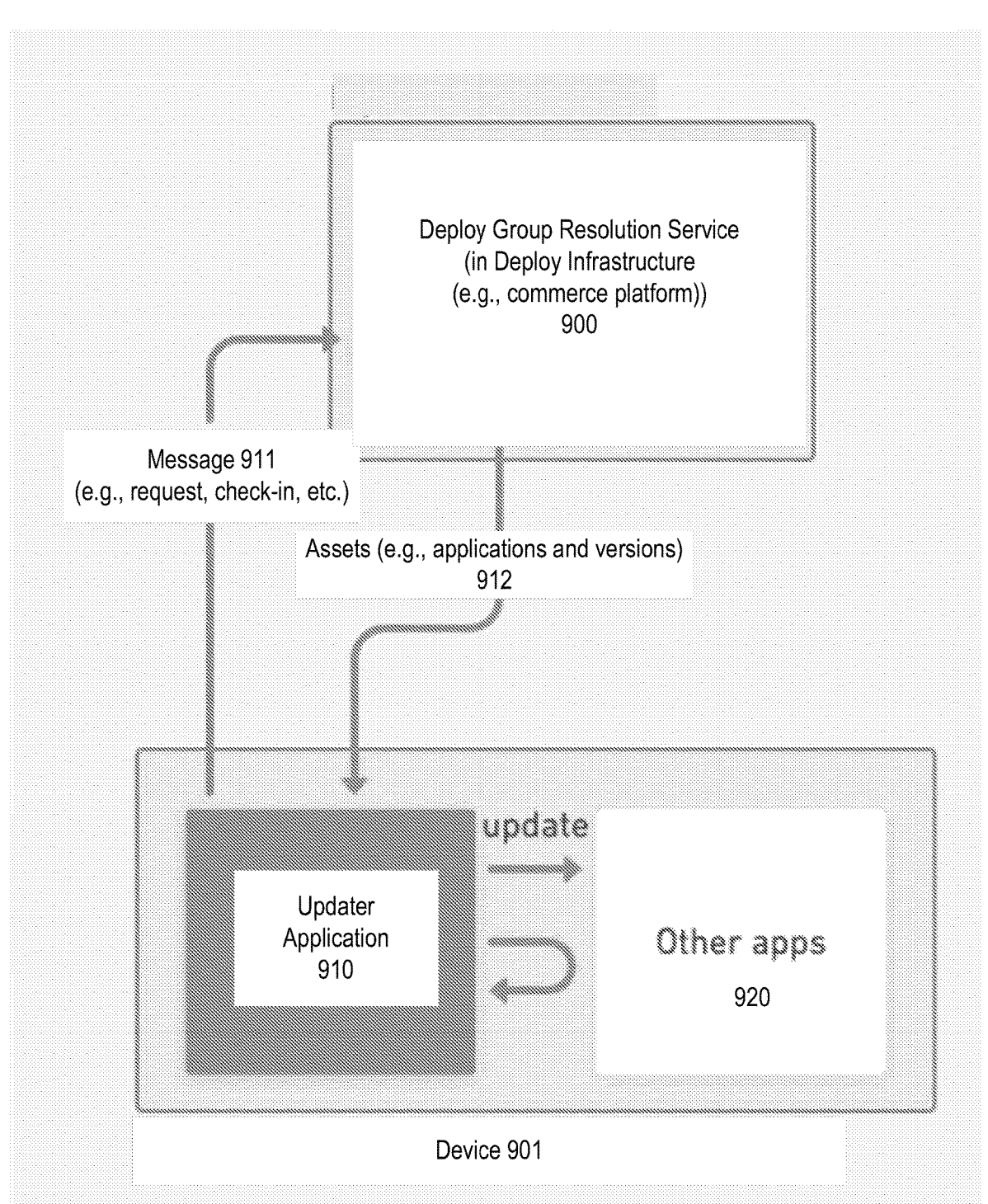
FIG. 9 illustrates some embodiments of a deploy infrastructure for providing over the air updates to applications on a mobile device.

FIG. 9 illustrates one embodiment of a deploy infrastructure described herein providing over the air updates to applications on a mobile device. Referring to FIG. 9, a managed device 901 (e.g., a mobile device) is communicably coupled to a deploy groups resolution service 900. In some embodiments, the deploy groups resolution service 900 is part of a deploy infrastructure in a commerce platform, such as, for example, the commerce platform servers 150. The managed device 901 is able to receive updates to its applications and/or allows new applications and assets from the deploy group resolution service 900. In some embodiments, managed device 901 includes an updater application 910 that periodically polls the deploy groups resolution service 900 to determine whether there are any assets to be deployed to the managed device 901.

In some embodiments, the managed device 901 is coupled to the deploy groups resolution service 900 via a network connection such as, for example, the Internet. In some embodiments, the managed device 901 periodically checks in with the deploy groups resolution service 900 periodically via message 911 (e.g., check-in message, requests, etc.). In response to the message 911, the deploy groups resolution service 900 determines the desired applications and versions to be deployed to the managed device 901. In some embodiments, these asset versions are set by a user. The user may be a merchant or a developer. In response to the results of the determination, the deploy groups resolution service 900 provides the desired applications and versions 912, or access thereto, to the updater application 910. In response receiving the desired applications in versions 912, the updater application 910 updates the managed device 901 including other applications 920 that are already on the managed device 901.

In some alternative embodiments, instead of using the message 911, a hook (e.g., an Internet-of-Things (IoT) hook, etc.) may be used to trigger an update to managed device 901.

FIG. 10 is one embodiment of a computer system that may be used to support the systems and operations discussed herein. It will be apparent to those of ordinary skill in the art, however that other alternative systems of various system architectures may also be used.

The data processing system illustrated in FIG. 10 includes a bus or other internal communication means 1015 for communicating information, and one or more processor(s) 1010 coupled to the bus 1015 for processing information. The system further includes a random-access memory (RAM) or other volatile storage device 1050 (referred to as memory), coupled to bus 1015 for storing information and instructions to be executed by processor(s) 1010. Main memory 1050 also may be used for storing temporary variables or other intermediate information during execution of instructions by processor(s) 1010. The system also includes a read only memory (ROM) and/or static storage device 1020 coupled to bus 1015 for storing static information and instructions for processor(s) 1010, and a data storage device 1025 such as a magnetic disk or optical disk and its corresponding disk drive. Data storage device 1025 is coupled to bus 1015 for storing information and instructions.

The system may further be coupled to a display device 1070, such as a light emitting diode (LED) display or a liquid crystal display (LCD) coupled to bus 1015 through bus 1065 for displaying information to a computer user. An alphanumeric input device 1075, including alphanumeric and other keys, may also be coupled to bus 1015 through bus 1065 for communicating information and command selections to processor(s) 1010. An additional user input device is cursor control device 1080, such as a touchpad, mouse, a trackball, stylus, or cursor direction keys coupled to bus 1015 through bus 1065 for communicating direction information and command selections to processor 1010, and for controlling cursor movement on display device 1070.

Another device, which may optionally be coupled to computer system 1000, is a communication device 1090 for accessing other nodes of a distributed system via a network. The communication device 1090 may include any of a number of commercially available networking peripheral devices such as those used for coupling to an Ethernet, token ring, Internet, or wide area network. The communication device 1090 may further be a null-modem connection, or any other mechanism that provides connectivity between the computer system 1000 and the outside world. Note that any or all of the components of this system illustrated in FIG. 10 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Figure 11:
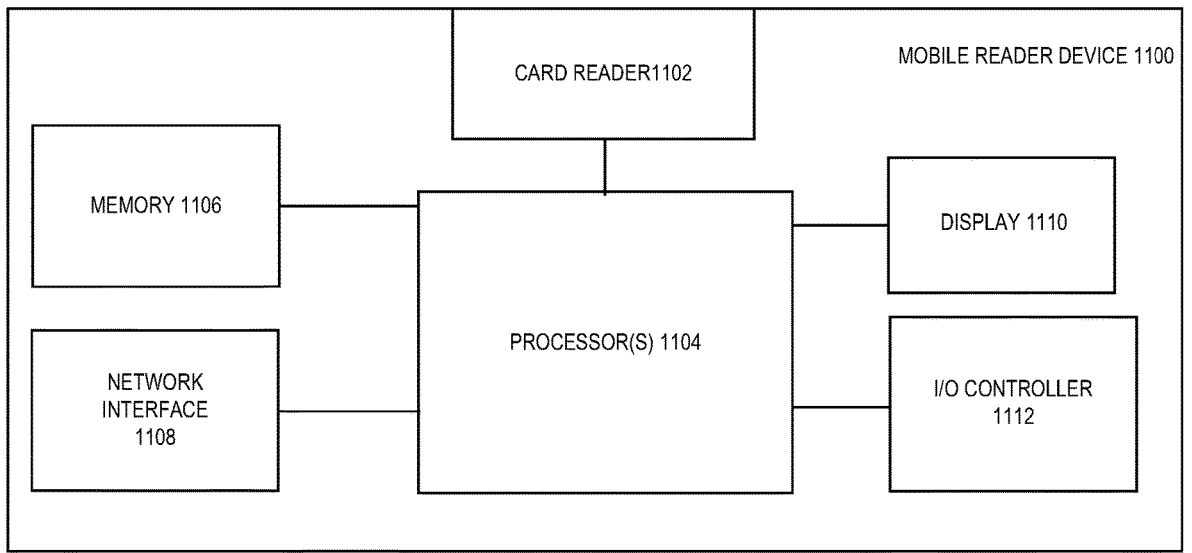
FIG. 11 is one embodiment of a reader device that may be used to support the systems and operations discussed herein.

FIG. 11 is a block diagram of one embodiment of a mobile device with a card or other type of reader. In some embodiments, the mobile device 1100 can include a combination of one or more processors 1104, a memory 1106, I/O controller 1112, network interface 1108, and display (e.g., display 1110), in accordance with the illustration of FIG. 11. Each mobile device may also include a number of processing modules, which may be implemented as hardware, software, firmware, or a combination. It should be appreciated that the mobile device may also include, although not illustrated, a user interface (e.g., keyboard, touch-screen, buttons, or similar user input devices), a power device (e.g., a battery), as well as other components typically associated with electronic devices. Network interfaces of each reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

Memory 1106 may be coupled to processor(s) in each reader device to store instructions for execution by processor(s) 1104. In some embodiments, the memory is non-transitory. It should be appreciated that embodiments as described herein may be implemented through the execution of instructions, for example as stored in the memory (e.g., memory 1106) or other element, by processor(s) 1104 of the mobile device and/or another circuitry of the mobile device. Particularly, circuitry of the reader devices, including but not limited to processor and card reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

There are a number of example embodiments described herein.

Example 1 is a method for performing a progressive rollout of assets, the method comprising: storing one or more asset versions to be deployed to a set of devices, each deploy group having one or more assets; receiving a request to approve a deploy plan, wherein each deploy plan specifies parameters for deploying a most recent version of one deploy group to a group of devices; activating the deploy plan in response to the request; determining, in response to a message received from each device of the group of devices, which asset versions are to be deployed to said each device and whether the asset versions are to be deployed to said each device at present time according to the deploy plan; and in response to determining the asset versions is to be deployed to said each device at the present time, sending a list of instructions to said each device, the instructions including installation instructions for at least one asset of the deploy group of assets.

Example 2 is the method of example 1 that may optionally include that the deploy plan specifies that the deploy group of assets is to be deployed is to be deployed to a first subset of the group of devices during a first time period and to a second subset of the group of devices during a second time period later than the first time period.

Example 3 is the method of example 1 that may optionally include that activating the deploy plan occurs after the deploy plan is reviewed and approved in response to a request to approve the deploy plan, and further comprising transitioning the deploy plan to an active state in which the deploy group of assets can be deployed to the group of devices.

Example 4 is the method of example 1 that may optionally include that determining whether the deploy group of assets is to be deployed to said each device at the present time is based on device type and location of the said each device.

Example 5 is the method of example 4 that may optionally include obtaining the device type said each device, the device type indicated by a device identifier of said each device; applying a hash function to the device identifier to obtain a hash number; and determining whether said each device is part of a current stage of the progressive rollout based on hash number.

Example 6 is the method of example 1 that may optionally include performing, by an updater application running on said each device, the list of instructions in order to update said each device with the deploy group of assets.

Example 7 is the method of example 1 that may optionally include monitoring deployment of the deploy group of assets under the deploy plan based on state information received from devices in the group of devices.

Example 8 is the method of example 7 that may optionally include pausing deployment under the deploy plan after monitoring indicates one or more asset versions in the deploy group of assets is functioning undesirably.

Example 9 is the method of example 8 that may optionally include performing one or more remediation actions to address the one or more assets functioning undesirably, including creating a new deploy plan with a new version of the one or more assets.

Example 10 is the method of example 1 that may optionally include assets of the one deploy group include a new version of a previously existing application on the one device, the previously existing application with a configuration change, or a new application.

Example 11 is the method of example 1 that may optionally include that the application is for handling commercial transactions.

Example 12 is the method of example 11 that may optionally include that the group of devices comprise mobile devices for use in processing payments for the commercial transactions.

Example 13 is a system for managing deployment of applications, the system comprising: one or more hardware processors; a memory comprising instructions which, when executed by the one or more hardware processors, cause the system to: store one or more asset versions to be deployed to a set of devices, each deploy group having one or more assets; receive a request to approve a deploy plan, wherein each deploy plan specifies parameters for deploying a most recent version of one deploy group to a group of devices; activate the deploy plan in response to the request; determine, in response to a message received from each device of the group of devices, which asset versions are to be deployed to said each device and whether asset versions are to be deployed to said each device at present time according to the deploy plan; and in response to determining the asset versions is to be deployed to said each device at the present time, send a list of instructions to said each device, the instructions including installation instructions for at least one asset of the deploy group of assets.

Example 14 is the system of example 13 that may optionally include that the deploy plan specifies that the deploy group of assets is to be deployed is to be deployed to a first subset of the group of devices during a first time period and to a second subset of the group of devices during a second time period later than the first time period.

Example 15 is the system of example 13 that may optionally include that the one or more hardware processors are configured to activate the deploy plan occurs after the deploy plan is reviewed and approved in response to a request to approve the deploy plan, and the one or more hardware processors are configured to transition the deploy plan to an active state in which the deploy group of assets can be deployed to the group of devices.

Example 16 is the system of example 13 that may optionally include that the one or more hardware processors are configured to determine whether the deploy group of assets is to be deployed to said each device at the present time is based on device type and location of the said each device.

Example 17 is the system of example 16 that may optionally include that the one or more hardware processors are configured to: obtain the device type said each device, the device type indicated by a device identifier of said each device; apply a hash function to the device identifier to obtain a hash number; and determine whether said each device is part of a current stage of the progressive rollout based on hash number.

Example 18 is one or more non-transitory computer readable storage media having instructions stored thereupon which, when executed by a system having at least a processor and a memory therein, cause the system to perform operations comprising: storing one or more asset versions to be deployed to a set of devices, each deploy group having one or more assets; receiving a request to approve a deploy plan, wherein each deploy plan specifies parameters for deploying a most recent version of one deploy group of the one or more deploy groups to a group of devices; activating the deploy plan in response to the request; determining, in response to a message received from each device of the group of devices, which asset versions are to be deployed to said each device and whether the asset versions are to be deployed to said each device at present time according to the deploy plan; and in response to determining the asset versions is to be deployed to said each device at the present time, sending a list of instructions to said each device, the instructions including installation instructions for at least one asset of the deploy group of assets.

Example 19 is the one or more non-transitory computer readable storage media of example 18 that may optionally include that the method further comprises: monitoring deployment of the deploy group of assets under the deploy plan based on state information received from devices in the group of devices; and pausing deployment under the deploy plan after monitoring indicates one or more assets in the deploy group of assets is functioning undesirably.

Example 20 one or more non-transitory computer readable storage media of example 19 that may optionally include that the method further comprises: performing one or more remediation actions to address the one or more assets functioning undesirably, including creating a new deploy plan with a new version of the one or more assets.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in some embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A method for performing a progressive rollout of assets, the method comprising:

storing one or more asset versions to be deployed to a set of devices, wherein a deploy plan specifies a subset of the devices and specifies which of the one or more asset versions form a deploy group that is to be deployed to the subset of the devices;

in response to receiving a request to approve the deploy plan, transitioning a state of the deploy plan to an approval state;

in response to receiving an approval signal of the deploy plan based on a review of the deploy plan, transitioning the state of the deploy plan from the approval state to an active state in which deployment of the deploy group to the subset of devices is permitted;

determining, in response to a message received from each device of the subset of devices, which asset versions are to be deployed to said each device and whether the asset versions are to be deployed to said each device at a present time according to the deploy plan;

in response to determining the asset versions to be deployed to said each device at the present time, sending a list of instructions to said each device, the instructions including installation instructions for at least one asset of the deploy group;

detecting that an installed asset is not functioning as expected, based on state information received from one or more of the subset of devices;

pausing deployment of the deploy plan, in response to detecting that the installed asset is not functioning as expected;

transitioning the deploy plan to a cancel state, wherein the deploy plan in the cancel state is blocked from returning to the active state;

creating a new deploy plan which specifies a second one or more asset versions that are to be deployed to the subset of devices; and transitioning a state of the new deploy plan, to the approval state, and waiting for the approval signal for the new deploy plan.

2. The method of claim 1 wherein the deploy plan specifies that the deploy group is to be deployed to the subset of devices during a first time period and to a second subset of devices during a second time period later than the first time period.

3. The method of claim 1 wherein determining whether the deploy group of assets is to be deployed to said each device at the present time is based on device type and location of the said each device.

4. The method of claim 3 further comprising:

obtaining the device type of said each device, the device type indicated by a device identifier of said each device;

applying a hash function to the device identifier to obtain a hash number; and determining whether said each device is part of a current stage of the progressive rollout based on the hash number.

5. The method of claim 1 further comprising, performing, by an updater application running on said each device, the list of instructions in order to update said each device with the deploy group of assets.

6. The method of claim 1, wherein the second one or more asset versions comprise a higher version of the one or more asset versions.

7. The method of claim 6 wherein the new deploy plan uses a same hash function as used in the deploy plan.

8. The method of claim 7 wherein the new deploy plan is associated with a same set of device IDs as identified by the deploy plan in the cancel state.

9. The method of claim 1 wherein assets of the respective deploy group include:

a new version of a previously existing application on the said each device, the previously existing application with a configuration change, or a new application.

10. The method of claim 9 wherein the previously existing application is for handling commercial transactions.

11. The method of claim 10 wherein the group of devices comprise mobile devices for use in processing payments for the commercial transactions.

12. A system for managing deployment of applications, the system comprising:

one or more hardware processors;

a memory comprising instructions which, when executed by the one or more hardware processors, cause the system to:

store one or more asset versions to be deployed to a set of devices, wherein a deploy plan specifies a subset of the devices and specifies which of the one or more asset versions form a deploy group that is to be deployed to the subset of the devices;

in response to receiving a request to approve the deploy plan, transition a state of the deploy plan to an approval state;

in response to receiving an approval signal of the deploy plan based on a review of the deploy plan, transition the state of the deploy plan from the approval state to an active state in which deployment of the deploy group to the subset of devices is permitted;

determine, in response to a message received from each device of the subset of devices, which asset versions are to be deployed to said each device and whether asset versions are to be deployed to said each device at a present time according to the deploy plan;

in response to determining the asset versions is to be deployed to said each device at the present time, send a list of instructions to said each device, the instructions including installation instructions for at least one asset of the deploy group;

detect that an installed asset is not functioning as expected, based on state information received from one or more of the subset of devices;

pause deployment of the deploy plan, in response to detecting that the installed asset is not functioning as expected;

transition the deploy plan to a cancel state, wherein the deploy plan in the cancel state is blocked from returning to the active state;

create a new deploy plan which specifies second one or more asset versions that are to be deployed to the subset of devices; and transition a state of the new deploy plan, to the approval state, and waiting for the approval signal for the new deploy plan.

13. The system of claim 12 wherein the deploy plan specifies that the deploy group is to be deployed to the subset of devices during a first time period and to a second subset of devices during a second time period later than the first time period.

14. The system of claim 12 wherein the one or more hardware processors are configured to determine whether the deploy group of assets is to be deployed to said each device at the present time is based on device type and location of the said each device.

15. The system of claim 14 wherein the one or more hardware processors are configured to:

obtain the device type of said each device, the device type indicated by a device identifier of said each device;

apply a hash function to the device identifier to obtain a hash number; and determine whether said each device is part of a current stage of the progressive rollout based on the hash number.

16. One or more non-transitory computer readable storage media having instructions stored thereupon which, when executed by a system having at least a processor and a memory therein, cause the system to perform operations comprising:

storing one or more asset versions to be deployed to a set of devices, wherein a deploy plan specifies a subset of the devices and specifies which of the one or more asset versions form a deploy group that is to be deployed to the subset of the devices;

in response to receiving a request to approve the deploy plan, transitioning a state of the deploy plan to an approval state;

in response to receiving an approval signal of the deploy plan based on a review of the deploy plan, transitioning the state of the deploy plan from the approval state to an active state in which deployment of the deploy group to the subset of devices is permitted;

determining, in response to a message received from each device of the subset of devices, which asset versions are to be deployed to said each device and whether the asset versions are to be deployed to said each device at present time according to the deploy plan;

in response to determining the asset versions is to be deployed to said each device at the present time, sending a list of instructions to said each device, the instructions including installation instructions for at least one asset of the deploy group;

detecting that an installed asset is not functioning as expected, based on state information received from one or more of the subset of devices;

pausing deployment of the deploy plan, in response to detecting that the installed asset is not functioning as expected;

transitioning the deploy plan to a cancel state, wherein the deploy plan in the cancel state is blocked from returning to the active state;

creating a new deploy plan which specifies second one or more asset versions that are to be deployed to the subset of devices; and transitioning a state of the new deploy plan, to the approval state, and waiting for the approval signal for the new deploy plan.

17. The one or more non-transitory computer readable storage media of claim 16 wherein the new deploy plan uses a same hash function as used in the deploy plan in the cancel state.

18. The one or more non-transitory computer readable storage media of claim 17 wherein the second one or more assets versions comprise a higher version of the one or more asset versions.

* * * * *